United States Patent
Bein et al.

(10) Patent No.: US 12,092,319 B2
(45) Date of Patent: Sep. 17, 2024

(54) VEHICLE INTERIOR ILLUMINATION UNIT

(71) Applicants: Faurecia Innenraum Systeme GmbH, Hagenbach (DE); HELLA GmbH & Co. KGaA, Lippstadt (DE)

(72) Inventors: Henning Bein, Hagenbach (DE); Robin Hofner, Lippstadt (DE); Maxime Musy, Hagenbach (DE)

(73) Assignees: Faurecia Innenraum Systeme GmbH, Hagenbach (DE); HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/240,524

(22) Filed: Aug. 31, 2023

(65) Prior Publication Data

US 2024/0077187 A1    Mar. 7, 2024

(30) Foreign Application Priority Data

Sep. 5, 2022   (DE) ..................... 10 2022 122 447.3

(51) Int. Cl.
   *F21V 7/04*     (2006.01)
   *F21W 106/00*   (2018.01)
   *F21Y 115/10*   (2016.01)

(52) U.S. Cl.
   CPC ......... *F21V 7/041* (2013.01); *F21W 2106/00* (2018.01); *F21Y 2115/10* (2016.08)

(58) Field of Classification Search
   CPC .............................. F21V 7/09; B60Q 2500/00
   See application file for complete search history.

(56) References Cited

U.S. PATENT DOCUMENTS

| | | | | |
|---|---|---|---|---|
| 6,840,654 | B2 * | 1/2005 | Guerrieri | F21V 29/83 362/241 |
| 7,993,033 | B2 * | 8/2011 | Moriyama | F21V 17/12 362/217.05 |
| 8,482,014 | B2 * | 7/2013 | Higuchi | F21S 8/026 257/E33.068 |
| 8,556,458 | B2 * | 10/2013 | Higuchi | F21K 9/68 362/97.3 |
| 11,607,992 | B2 | 3/2023 | Hallitschke et al. | |
| 2008/0074889 | A1 * | 3/2008 | Gloisten | F21V 29/70 362/341 |
| 2010/0165641 | A1 * | 7/2010 | Cheng | F21V 17/164 362/346 |
| 2015/0003074 | A1 * | 1/2015 | Calvin | F21S 45/30 362/297 |
| 2018/0356050 | A1 | 12/2018 | Petluri et al. | |
| 2022/0153188 | A1 | 5/2022 | Hallitschke et al. | |

FOREIGN PATENT DOCUMENTS

| | | |
|---|---|---|
| CN | 110349512 A | 10/2019 |
| DE | 112020000224 T5 | 9/2021 |
| EP | 3796075 A1 | 3/2021 |
| KR | 20090111405 A | 10/2009 |
| KR | 20090111406 A | 10/2009 |
| KR | 100980787 B1 | 9/2010 |
| KR | 20190053312 A | 5/2019 |

* cited by examiner

*Primary Examiner* — Eric T Eide
(74) *Attorney, Agent, or Firm* — Carlson, Gaskey & Olds, P.C.

(57) ABSTRACT

A vehicle interior illumination unit has a front diffuser panel and a rear reflector having centric and outer reflector cones into which light sources arranged on an illumination panel protrude at the rear. The centric and outer reflector cones widen towards the front diffuser panel and preferably have different cross sections.

12 Claims, 2 Drawing Sheets

VEHICLE INTERIOR ILLUMINATION UNIT

CROSS-REFERENCE TO RELATED APPLICATION

This application is a U.S. non-provisional application claiming the benefit of German Application No. 10 2022 122 447.3, filed on Sep. 5, 2022, which is incorporated herein by reference in its entirety.

TECHNICAL FIELD

The disclosure relates to a vehicle interior illumination unit.

BACKGROUND

In vehicle interiors, decorative parts are now being backlit more and more. This significantly increases the quality rating of the interior. Moreover, additional equipment packages having interior backlighting are very popular and are therefore important to the automotive manufacturer. High-quality backlighting is characterized, inter alia, in that the light distribution is segmented and, as a result, can be controlled dynamically and individually.

For previous illumination units in the vehicle interior, the aim was to illuminate said illumination units as uniformly as possible. Thus, it is important to allow the light emission of the individual light sources to overlap one another if possible. Usually, a plurality of light sources spaced equally from one another are used to illuminate an area. Such a light source matrix is advantageous for emitting light homogeneously.

In addition, it has always been common practice in the prior art to cover the individual light sources as far as possible toward the front diffuser panel so that the light sources do not stand out too much from the surroundings at the front and cannot be perceived individually.

SUMMARY

A vehicle interior illumination unit is provided whose illuminated appearance can be designed in a more customized manner and very easily.

This is achieved by a vehicle interior illumination unit having a front diffuser panel, a rear illumination panel having a plurality of light sources mounted thereon, as well as a reflector provided between the diffuser panel and the illumination panel and having a plurality of adjacent reflector cones extending from associated light sources in a direction towards the diffuser panel, wherein the reflector has an outer peripheral edge, which is adjoined by outer reflector cones, and also centric reflector cones located remotely from the outer peripheral edge, wherein the reflector cones widen toward the diffuser panel.

Via the reflector cones on the outer peripheral edge, the light guidance in this region can be designed in a simple and more customized manner. The plurality of cones on the outer peripheral edge also ensures that different light guidances are possible over the course of the peripheral edge as well.

The individual light sources are associated with individual reflector cones so that one light source also does not supply a plurality of reflector cones. Thus, an outer light source supplies only one outer reflector cone, and a centric light source supplies only one centric reflector cone. This also allows the light in the region to be customized very easily and well.

The reflector cones make it possible to illuminate individual fields on the diffuser panel differently than adjacent fields. In particular, it is very simple in this way to let the light "fade" toward the edge of the diffuser panel and thus toward the edge of the illumination unit, i.e., to achieve a continuous transition to darkness. In addition, it is also possible to illuminate individual fields, each of which is defined by a reflector cone, differently than adjacent fields, i.e., in a different color or more or less brightly than other fields.

According to one variant of the disclosure, the cross sections of the central reflector cones, with respect to a sectional plane parallel to the illumination panel, in particular a sectional plane through the widest part of the cones, are different than those of the outer reflector cones.

It can be advantageous in this respect that the cross sections of the outer reflector cones are larger, in particular having a greater longitudinal extension than those of the centric reflector cones, so that the light can be guided from a light source further remote from the outer peripheral edge to the outer peripheral edge via this elongated and larger reflector cone. In particular, the smallest distance between the perpendicular projection of an outer light source onto the diffuser panel and the outer peripheral edge is greater than the smallest distance between the perpendicular projection of the outer light source onto the diffuser panel and the perpendicular projection of a nearby centric light source onto the diffuser panel. Thus, the diffuser panel becomes gradually darker toward the outer peripheral edge.

The reflector cones may be defined by reflective walls, for example. It has been found that the upper side edges of the walls of the outer reflector cone, which face the diffuser panel, and which extend to the outer peripheral edge should preferably extend obliquely to the outer peripheral edge and transition thereinto. As a result of an oblique orientation, the path of the light from a light source located near the center to the outer peripheral edge is longer, as a result of which the light at the front fades more softly toward the outer peripheral edge.

At least one, preferably exactly one, light source can be provided at the lowest and narrowest point of each reflector cone.

In particular, the associated light sources or the singular associated light source of the respective reflector cone are shielded from the adjacent reflector cone by the reflector cone. This avoids scattered light and ensures that the light energy assigned to a reflector cone can be predefined very well.

The central reflector cones may have a quadrangular, in particular square, cross section, in particular at the widest part. The cross section may be rounded in the direction of the light source and, at the narrowest part, may even correspond to the cross section of the light source.

In a plan view of the reflector, the upper edges of the walls of adjacent reflector cones result in particular in a type of lattice shape.

The outer reflector cones may, for example, have an elongated cross section, in particular at the widest part. Some of the outer reflectors may even have a quadrangular cross section. However, depending on the shape of the outer peripheral edge, the outer reflector cones can be adapted to this shape. If, for example, there are curvatures in the reflector cone, the walls may also be adapted to this shape.

One variant of the disclosure provides that the reflector extends to the diffuser panel, preferably even rests on the rear thereof. This also serves to be able to optimally match and customize individual light fields. In this case, the upper edges of the walls rest against the rear of the diffuser panel.

To ensure that the partition walls between adjacent reflector cones are not visible on the front of the diffuser panel, a possibly small clearance of at most 2 mm between the front of the reflector and the rear of the diffuser panel may be advantageous.

The reflector having the reflector cones is in particular a one-piece component. It comprises all walls of the outer reflector cones as well as those of the central reflector cones. The inside of the cones may be coated with reflective material. The advantage of this is that a wider range of materials, in particular of more cost-effective materials, is available.

The light sources may in particular be LEDs which are mounted on an illumination panel in the form of a printed circuit board. The LEDs may be arranged symmetrically in a lattice on the printed circuit board.

In order to illuminate the individual reflector cones individually, it may be expedient to use light sources, i.e., LEDs, of different intensities or different colors.

A further improvement can result from the illumination panel being accommodated in a trough that is open toward the illumination panel and that adjoins the rear of the illumination panel. Thus, the illumination panel is, where applicable, protected and the entire vehicle interior illumination unit is closed at the rear in order to be protected against entry of dust and, where applicable, moisture as well.

BRIEF DESCRIPTION OF THE DRAWINGS

Further features and advantages of the disclosure become apparent from the following description of some embodiments and from the following drawings, to which reference is made. In the drawings.

DETAILED DESCRIPTION

Figure 1:
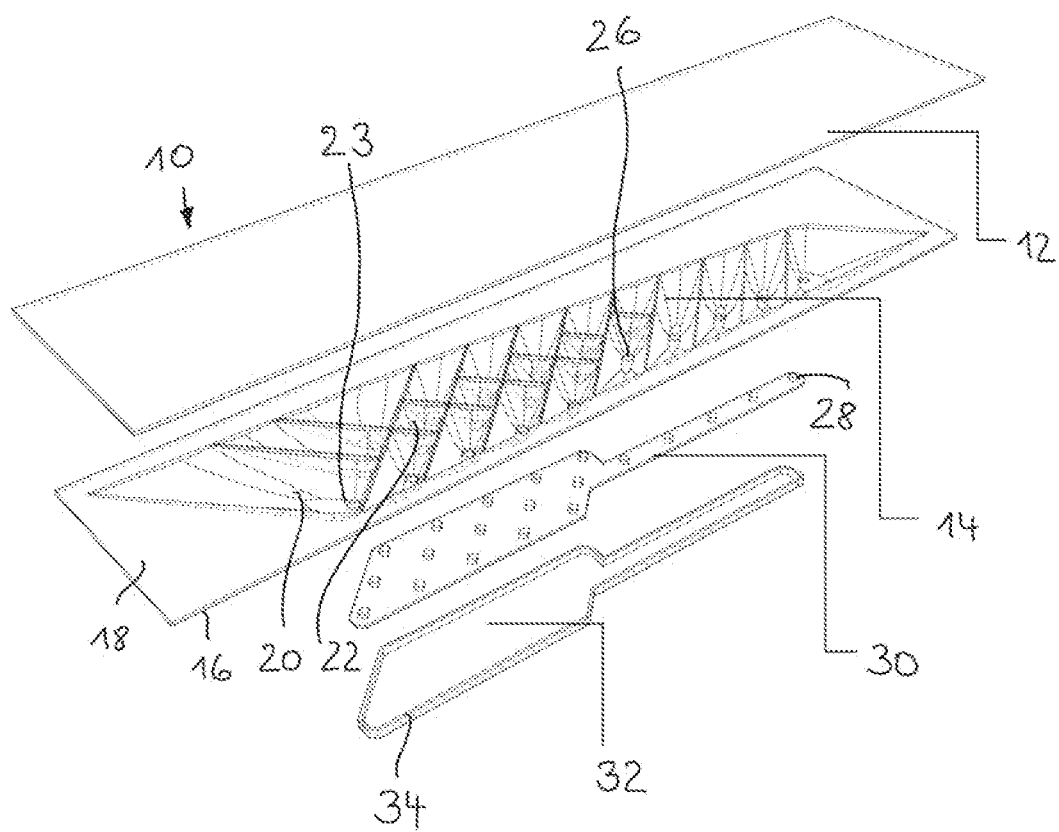
FIG. 1 shows an exploded view of a variant of the vehicle interior illumination unit according to the disclosure.

FIG. 1 shows a vehicle interior illumination unit 10 which comprises various parts assembled in layers.

A diffuser panel 12, which comprises, for example, translucent material, is present at the front. The diffuser panel 12 is shown in the present case as a plate, but it may also be curved in any way. The diffuser panel 12 is preferably made of a plastic.

In particular, it is possible to form the diffuser panel 12 as an independent component part or to use it as a carrier for further process steps, for example lamination with an upper material. The area of application is typically the vehicle interior, for example attached to the door areas or the dashboard.

It is also possible to either overlay the diffuser panel 12 at the front with another light-transmissive decorative part, or to cover the diffuser panel 12 in sections with an opaque front layer. For example, layers of textile, leather, wood, or plastic can be used for overlaying or covering.

A reflector 14 adjoins the rear of the diffuser panel 12. This reflector 14 is preferably made of plastic, wherein this is not to be understood as limiting.

The reflector 14 having a plurality of reflector cones is in particular a one-piece part, e.g., a cast part.

On its outer periphery 16, which surrounds the reflector 14 in a view from above onto the reflector 14, an outer peripheral edge 18, which is present on an upper side of the reflector, adjoins on the upper side. In regions, the outer peripheral edge 18 may have a different lateral width parallel to the diffuser panel 12 and may correspond to the shape of the rear of the adjoining diffuser panel 12, as shown in FIG. 1 for a rectangular diffuser panel 12. In other embodiments with a constant width, the outer peripheral edge 18 may follow the contour of the outer reflector cones.

In the illustrated embodiment, this outer peripheral edge 18 is designed as a planar surface at the front of the reflector 14.

The reflector 14 comprises a plurality of reflector cones 20, 22, which are explained below with reference to FIG. 2.

The reflector cones 20, 22, of which only two are provided with reference signs for the sake of clarity, widen from their bottom 23 (lowest point of the reflector cone) in the direction toward the diffuser panel 12.

This widening is preferably continuous, i.e., without cross-sectional jumps. The reflector cones 20, 22 are delimited by walls 24.

At the bottom 23 of each reflector 14, the latter has an opening 26 or optionally a plurality of openings 26, wherein a light source 28, which in the present case is designed as an LED, passes through the corresponding openings. Alternatively, the reflectors have no opening at the bottom and the bottoms are light-transmissive.

All light sources are mounted on a one-piece or multi-piece illumination panel 30, which is designed as a printed circuit board.

The illumination panel 30 is thus located on the rear of the reflector 14 and preferably contacts the latter so that the projecting light sources protrude into the respective associated reflector cone 20, 22.

At the rear, the illumination panel 30 is adjoined by a trough 32 which is open toward the illumination panel 30 and which accommodates the illumination panel 30 and covers it at the rear and laterally.

The shape of the open trough 32 is adapted to the peripheral shape of the illumination panel 30. Alternatively, the shape of the open trough 32 is adapted to the peripheral shape of the reflector or the peripheral shape of the diffuser panel.

Depending on how the rear of the reflector 14 is designed, the trough 32 may rest flat against the rear of the reflector 14 at its circumferential peripheral edge 34 projecting toward the reflector 14.

Figure 2:
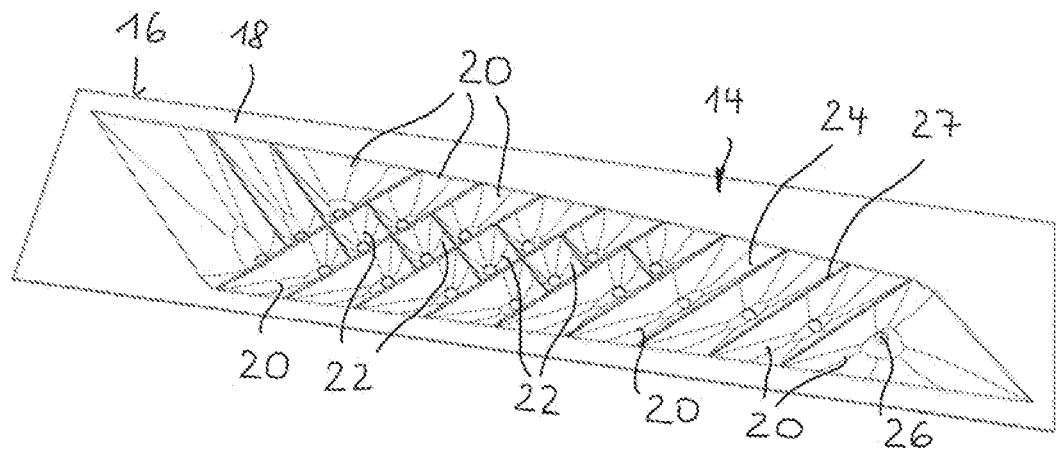
FIG. 2 shows a perspective view of the reflector in FIG. 1.

FIG. 2 shows the reflector 14 by itself. Here, it can be seen that there are outer reflector cones 20 adjoining the outer peripheral edge 18, only some of which are provided with reference signs, and centric reflector cones 22 which are adjacent to the outer reflector cones 20 and do not extend to the outer peripheral edge 18.

Preferably, and this is not to be understood as limiting, the centric reflector cones 22 have a quadrangular, preferably square, cross section (in plan view or in sections parallel to the diffuser panel 12 or parallel to the illumination panel 30, whereas the outer reflector cones 20 are elongated in cross section, here preferably polygonal, namely, either quadrangular or triangular.

The reflector cones 20, 22 are delimited by the walls 24, the inner side of which is designed to be reflective.

Figure 3:
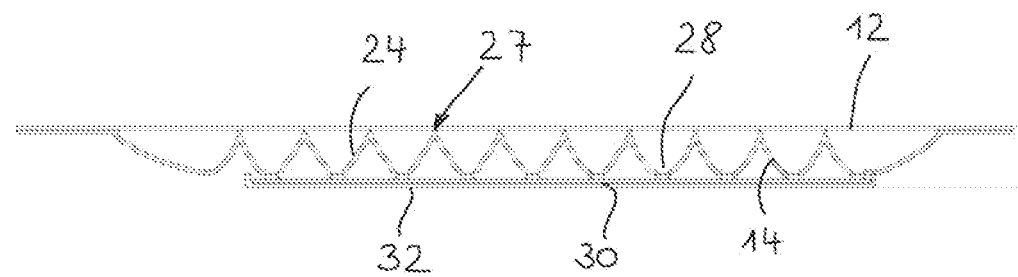
FIG. 3 shows a longitudinal sectional view through the vehicle interior illumination unit according to FIG. 1.

As can be seen in FIGS. 2 and 3, these walls 24 extend to a plane defined by the outer peripheral edge 18.

The corresponding upper edges 27 of the walls extend, as shown in FIG. 2, either parallel or perpendicularly to one another so that a kind of lattice structure results in part.

In addition, the upper edges 27 also extend obliquely to the outer peripheral edge 18 and then also transition into the outer peripheral edge 18.

The centric reflector cones 22 are smaller in their cross section than the outer reflector cones 20, which has the result, if the light sources 28 all have the same intensity, that the corresponding fields that result at the diffuser panel 12 shine with different brightness.

Since the reflector 14 rests with its walls 24 and the upper edges 27 thereof against the rear of the diffuser panel 12 (as well as the outer peripheral edge 18 rests against the rear of the diffuser panel 12), illumination fields separated from one another result on the front of the diffuser panel 12.

In the case of light sources 28 of equal intensity, the fields delimited by the centric reflector cones 22 accordingly shine more brightly than those of the outer reflector cones 20.

This allows special effects to be achieved, because the light generated does not stop at the edge of the diffuser panel 12 but rather transitions continuously thereinto. In other words, the diffuser panel 12 becomes increasingly darker towards the peripheral edge.

This is also achieved by the light sources in the outer reflector cones 20 being arranged asymmetrically within the cones. This means that the distances (as seen in plan view) of the light sources 28 to the closest part of the outer peripheral edge 18 are greater than to the adjoining upper edge 27 of the adjacent, centric reflector cone 22. The light is thus concentrated more strongly in the center of the diffuser panel 12.

Figure 4:
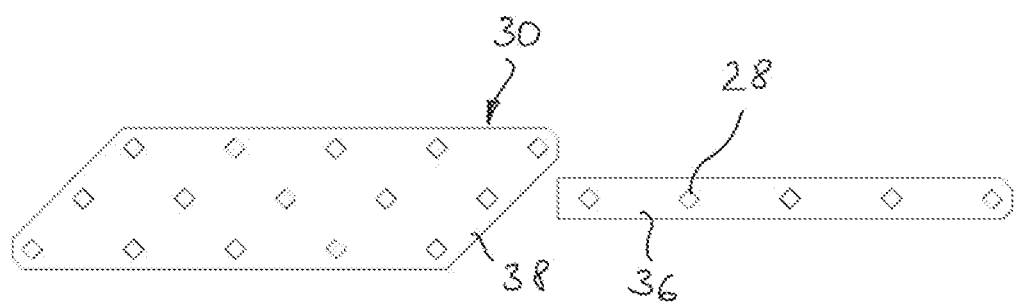
FIG. 4 shows an illumination panel modified with respect to the variant according to FIG. 1 as part of the vehicle interior illumination unit according to the disclosure.

FIG. 4 shows a variant of the embodiment according to FIGS. 1 to 3 of the illumination panel 30, which is namely assembled from two individual panels 36, 38. The luminous sources are arranged in a lattice on each individual panel.

The illumination panels 30 are standard panels, i.e., they are standardized with respect to the spacing of their light sources 28, which saves costs. It is therefore only a matter of designing the reflector 14 as optimized as possible in order to provide the vehicle interior illumination unit with a high-quality appearance when the illumination is switched on.

The invention claimed is:

1. A vehicle interior illumination unit, comprising:
   a front diffuser panel;
   a rear illumination panel having a plurality of light sources mounted thereon;
   a reflector provided between the front diffuser panel and the rear illumination panel, which has a plurality of reflector cones extending from associated light sources of the plurality of light sources in a direction towards the front diffuser panel;
   at least one light source of the plurality of light sources is provided at each lowest point of each reflector cone;
   wherein the reflector has an outer peripheral edge, which is adjoined by outer reflector cones of the plurality of reflector cones, and centric reflector cones of the plurality of reflector cones are located remotely from the outer peripheral edge;
   wherein the plurality of reflector cones widen towards the front diffuser panel;
   wherein the reflector extends to the front diffuser panel;
   wherein upper edges of reflector walls delimiting the plurality of reflector cones, which face the front diffuser panel, rest against a rear of the front diffuser panel to separate the reflector cones from each other; and
   wherein the plurality of light sources in the outer reflector cones are arranged asymmetrically within the outer reflector cones as seen in a plan view onto the plurality of reflector cones.

2. The vehicle interior illumination unit according to claim 1, wherein the centric reflector cones have a different cross section relative to a sectional plane parallel to the rear illumination panel than the outer reflector cones.

3. The vehicle interior illumination unit according to claim 2, wherein the outer reflector cones have a larger cross section than the centric reflector cones.

4. The vehicle interior illumination unit according to claim 1, wherein the plurality of reflector cones are defined by reflective walls, and upper edges of the reflective walls of the outer reflector cones, which face the front diffuser panel, extend obliquely to the outer peripheral edge.

5. The vehicle interior illumination unit according to claim 1, wherein the centric reflector cones have a quadrangular cross section relative to a sectional plane parallel to the rear illumination panel.

6. The vehicle interior illumination unit according to claim 1, wherein the plurality of light sources are LEDs and the rear illumination panel is at least one printed circuit board.

7. The vehicle interior illumination unit according to claim 1, wherein the rear illumination panel is accommodated in a trough which is open toward the rear illumination panel and which adjoins a rear of the rear illumination panel.

8. The vehicle interior illumination unit according to claim 1, wherein exactly one light source of the plurality of light sources is provided at each lowest point of each reflector cone.

9. The vehicle interior illumination unit according to claim 1, wherein the centric reflector cones have a square cross section relative to a sectional plane parallel to the rear illumination panel.

10. The vehicle interior illumination unit according to claim 1, wherein the reflector extends to the front diffuser panel and rests against a rear thereof, and/or wherein upper edges of reflector walls delimiting the plurality of reflector cones, which face the front diffuser panel, rest against a rear of the front diffuser panel.

11. A vehicle interior illumination unit, comprising:
    a front diffuser panel;
    a rear illumination panel having a plurality of light sources mounted thereon;
    a reflector provided between the front diffuser panel and the rear illumination panel, the reflector having a plurality of adjacent reflector cones extending from associated light sources in a direction towards the front diffuser panel;
    at least one light source of the plurality of light sources is provided at each lowest point of each reflector cone;
    wherein the reflector extends to the front diffuser panel;
    wherein upper edges of reflector walls delimiting the plurality of adjacent reflector cones, which face the front diffuser panel, rest against a rear of the front diffuser panel to separate the plurality of adjacent reflector cones from each other;
    wherein the reflector has an outer peripheral edge, which is adjoined by outer reflector cones of the plurality of adjacent reflector cones, and centric reflector cones of the plurality of adjacent reflector cones are located remotely from the outer peripheral edge;

wherein the plurality of adjacent reflector cones widen towards the front diffuser panel; and wherein the plurality of light sources have equal intensity; and wherein distances, as seen in a plan view, of the plurality of light sources of the outer reflector cones to a closest part of the outer peripheral edge are greater than to an adjoining upper edge of an adjacent, centric reflector cone.

12. A vehicle interior illumination unit, comprising:

a front diffuser panel;

a rear illumination panel having a plurality of light sources mounted thereon;

a reflector provided between the front diffuser panel and the rear illumination panel, the reflector having a plurality of adjacent reflector cones extending from associated light sources in a direction towards the front diffuser panel;

at least one light source of the plurality of light sources is provided at each lowest point of each reflector cone;

wherein the reflector extends to the front diffuser panel;

wherein upper edges of reflector walls delimiting the plurality of adjacent reflector cones, which face the front diffuser panel, rest against a rear of the front diffuser panel to separate the plurality of adjacent reflector cones from each other;

wherein the reflector has an outer peripheral edge, which is adjoined by outer reflector cones of the plurality of adjacent reflector cones, and centric reflector cones of the plurality of adjacent reflector cones are located remotely from the outer peripheral edge;

wherein the centric reflector cones have a quadrangular cross section whereas the outer reflector cones have an elongate shape;

wherein the plurality of adjacent reflector cones widen towards the front diffuser panel; and wherein the centric reflector cones are smaller in cross section than the outer reflector cones, and fields delimited by the centric reflector cones shine more brightly than those defined by fields of the outer reflector cones.

* * * * *